(12) United States Patent
Muramatsu

(10) Patent No.: US 7,095,202 B2
(45) Date of Patent: Aug. 22, 2006

(54) PERFORMANCE INPUT APPARATUS

(75) Inventor: Shigeru Muramatsu, Mori-machi (JP)

(73) Assignee: Yamaha Corporation, Hamamatsu (JP)

( * ) Notice: Subject to any disclaimer, the term of this patent is extended or adjusted under 35 U.S.C. 154(b) by 72 days.

(21) Appl. No.: 10/809,385

(22) Filed: Mar. 26, 2004

(65) Prior Publication Data

US 2004/0189599 A1    Sep. 30, 2004

(30) Foreign Application Priority Data

Mar. 27, 2003    (JP) ............... 2003-088099

(51) Int. Cl.
  *B25J 5/00* (2006.01)
  *G10H 1/34* (2006.01)
(52) U.S. Cl. ............ 318/568.12; 701/23; 901/1
(58) Field of Classification Search ........ 318/560, 318/568.12, 648; 74/469, 479; 701/23; 901/1
See application file for complete search history.

(56) References Cited

U.S. PATENT DOCUMENTS

| | | | |
|---|---|---|---|
| 4,264,852 A * | 4/1981 | Derossi ............... 318/648 |
| 4,584,896 A * | 4/1986 | Letovsky ............. 74/490.1 |
| 4,911,033 A * | 3/1990 | Rosheim et al. ...... 74/490.03 |
| 5,007,300 A * | 4/1991 | Siva ................... 74/471 XY |
| 5,451,134 A * | 9/1995 | Bryfogle ............... 414/680 |
| 5,796,927 A * | 8/1998 | Hegg .................... 700/260 |
| 5,952,806 A * | 9/1999 | Muramatsu ........ 318/568.12 |
| 6,066,794 A * | 5/2000 | Longo ................... 84/626 |
| 6,417,638 B1* | 7/2002 | Guy et al. ............. 318/560 |
| 6,879,315 B1* | 4/2005 | Guy et al. ............. 345/156 |

FOREIGN PATENT DOCUMENTS

| JP | 10-78778 A | 3/1998 |
|---|---|---|
| JP | 10-177387 A | 6/1998 |

* cited by examiner

*Primary Examiner*—Rita Leykin
(74) *Attorney, Agent, or Firm*—Smith Patent Office

(57) ABSTRACT

Operating section provided on a base is displaceable, in response to operation by a human operator, relative to the base with respect to at least one displacement axis, such as one linear-displacement axis and two rotary-displacement axes. A plurality of pivot axes are provided in corresponding relation to the displacement axes of the operating section. Different pieces of reactive force information are generated in correspondence with the individual pivot axes, and a plurality of motors, provided in corresponding relation to the pivot axes, are driven on the basis of the respective reactive force information, to thereby impart a separate or different reactive force to the operating section for each of the displacement axes. Displacement of the operating section is detected for at least one parameter from among parameters including a position, angle, velocity and acceleration, to output a detection signal corresponding to the detected parameter.

11 Claims, 4 Drawing Sheets

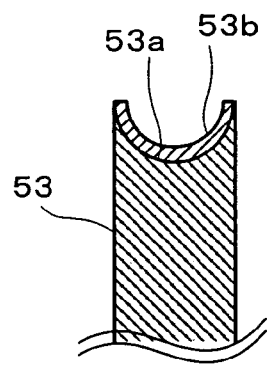
F I G. 4
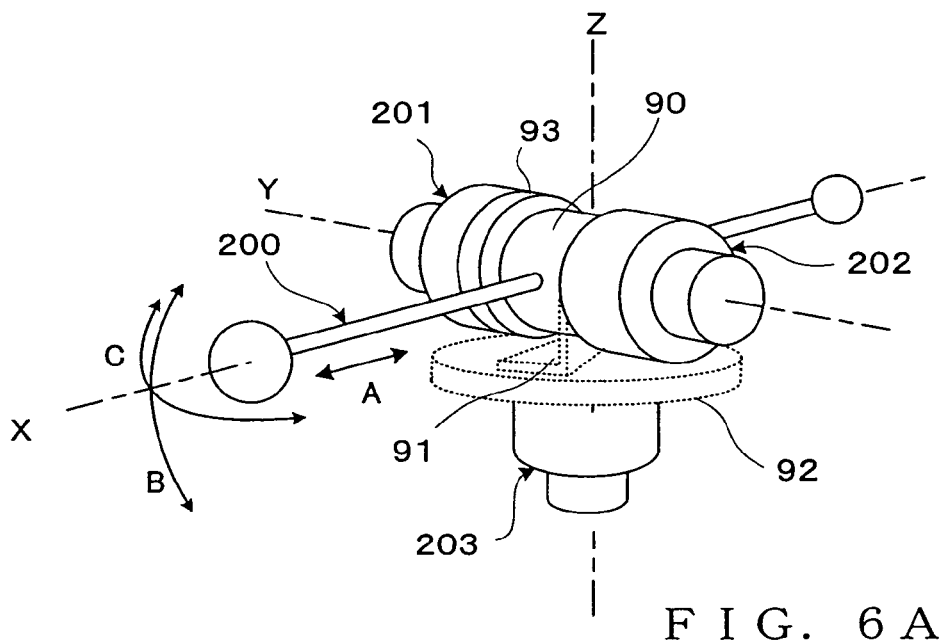
F I G. 6 A
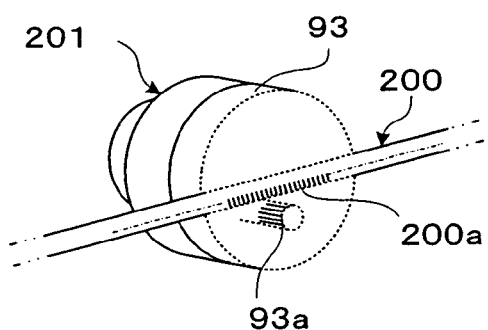
F I G. 6 B

PERFORMANCE INPUT APPARATUS

BACKGROUND OF THE INVENTION

The present invention relates to a performance input apparatus provided with an operating section displaceable about one or more axes, and more particularly to a technique of imparting the displaceable operating section with a virtual reactive force responsive to input operation (input operating force), by a human operator, of the operating section. For example, the performance input apparatus of the present invention is suitable for use as input apparatus of electronic musical instruments, as well as input apparatus for various games, computer-aided designing (CAD), etc.

In Japanese Patent Application Laid-open Publication No. HEI-10-177387 (hereinafter referred to as "prior art 1"), there is disclosed an apparatus which includes an operator operable by depression of a human operator, a cylindrical actuator for moving the operator and a sensor for detecting a position etc. of the operator. Driving of the actuator is controlled, on the basis of the position etc. of the operator detected by the sensor, to impart the operator with a reactive force responsive to an input operating force, by the human operator, of the operator.

In Japanese Patent Application Laid-open Publication No. HEI-10-78778 (hereinafter referred to as "prior art 2"), there is disclosed a string-instrument type performance input apparatus operable with a bow-shaped operator, which includes a photo sensor for detecting an operating speed (or velocity) and angle of the operator. The performance input apparatus also includes a pressure sensor for detecting an operating pressure applied by the operator to a slider section so that a current performance style of the bow-shaped operator (i.e., how the bow-shaped operator has been operated by a human operator) can be detected on the basis of the detected operating pressure.

The performance input apparatus disclosed in prior art 2 permits performance input, by the human operator, imitating or simulating performance styles that are commonly employed in violin-type instruments operable with a bow-shaped operator. However, with this input apparatus, which is not provided with any mechanism for imparting the operator with a reactive force responsive to an operating force applied to the operator, it is not possible to virtually reproduce, for example, a feeling of actual string rubbing with a bow-shaped operator, so that the sensory performance operation feelings obtained by the performance input apparatus tends to be very poor. This is because structural inconveniences and limitations, imposed by the provision of the photo sensor as operation detection means, make it difficult to provide a reactive force imparting mechanism capable of achieving desired reactive force characteristics responsive to input operation of the operator. If an arrangement employing a cylindrical actuator as disclosed in prior art 1 is used as the reactive force imparting mechanism, then the operator movable by the actuator would be limited to a relatively small range, and thus such an arrangement is not suited for impartment of a reactive force corresponding to relatively great displacement, such as that caused by string-rubbing operation, of the bow-shaped operator. Besides, the arrangement employing the cylindrical actuator would significantly increase the overall size of the apparatus. For these reasons, it has been considered undesirable to apply such a reactive force imparting mechanism to the conventional string-instrument type performance input apparatus.

SUMMARY OF THE INVENTION

In view of the foregoing, it is an object of the present invention to provide a performance input apparatus which can be suitably used to make performance input imitating performance styles that are employed in a violin-type instrument operable with a bow or other operator, by permitting detection of multi-axis operation of an operating section and reactive force impartment based on the operation detection.

In order to accomplish the above-mentioned object, the present invention provides a performance input apparatus, which comprises: a base section; an operating section displaceable, in response to operation by a human operator, relative to the base section with respect to at least one displacement axis; a pivot section including a rotary shaft rotatable about a predetermined pivot axis in response to the operation, by the human operator, of the operating section; a detection section that detects displacement of the operating section, responsive to the operation by the human operator, for at least one parameter selected from a group of parameters including a position, angle, velocity and acceleration, and outputs a detection signal corresponding to the detected parameter; a reactive force information generation section that generates reactive force information on the basis of the detection signal outputted by the detection section; a reactive force generation section that imparts a reactive force to the operating section by driving the rotary shaft of the pivot section on the basis of the reactive force information; and an output section that outputs a control signal responsive to the operation, by the human operator, of the operating section on the basis of the output detection signal.

In the present invention, the rotary shaft of the pivot section is caused to pivot about the predetermined pivot axis in response to operation, by the human operator, of the operating section, the detection section detects resultant displacement of the operating section, and the reactive force generation section drives the pivot section, in accordance with reactive force information generated on the basis of a displacement detection signal output from the detection section, to thereby impart a reactive force to the operating section. Namely, by detecting the positional displacement of the operating section as pivotal movement of the rotary shaft about the predetermined pivot axis and imparting a reactive force in a direction, opposite to the operated direction of the operating section, through the rotary shaft on the basis of the detected displacement, the inventive performance input apparatus, despite its small and simple structure, can impart a reactive force responsive to displacement of the operating section caused by operation by the human operator, and it can also properly detect relatively great displacement of the operating section and achieve appropriate reactive force impartment based on such displacement detection.

In the case where the operating section is displaceable, in response to operation by the human operator, with respect to, i.e. relative to, a plurality of displacement axes, the pivot section is provided with a plurality of rotary shafts so as to impart reactive forces to the operating section, subjected to multi-axis operation by the human operator, for the individual displacement axes. As a consequence, the present invention permits performance information input operation imitating or simulating performance styles that are employed in violin-type instruments operable with a bow-shaped operator or the like, with a small and simple structure. For example, the present invention can impart reactive forces to the operating section for the individual displacement axes, by detecting displacement of the operating section for the individual pivot axes and driving motors of the pivot axes in accordance with reactive force information generated on the basis of respective detection signals detected by the detection for the pivot axes.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 4 is a sectional view of a pulley taken along the p—p line of FIG. 3A;

FIG. 6A is a perspective view showing an operating section and pivot sections in a modified example of the performance input apparatus; and FIG. 6B is a schematic view showing an example specific structure of a gearbox in FIG. 6A.

DETAILED DESCRIPTION OF THE EMBODIMENTS

Description will be made hereinbelow about an embodiment of a performance input apparatus that is constructed to imitate an electronic musical instrument of a type where performance input operation is performed with a bow-shaped operator as in a string instrument, such as a violin.

Figure 1:
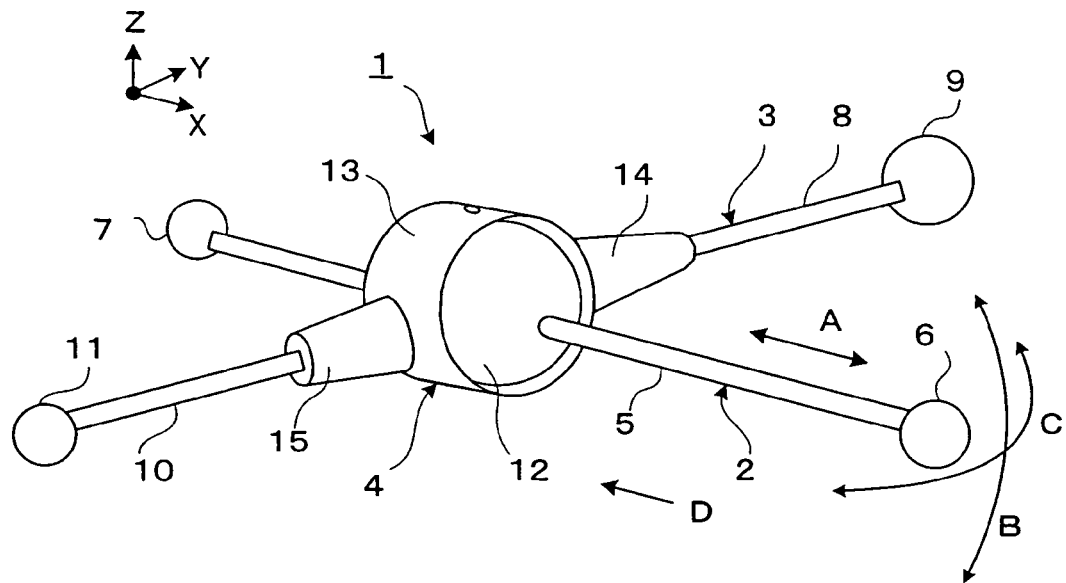
FIG. 1 is a perspective view showing an example outer appearance of a performance input apparatus in accordance with an embodiment of the present invention.

FIG. 1 is a perspective view showing an example of an outer appearance of the performance input apparatus 1, which generally comprises an operating section 2, a base section 3 and a junction section 4 connecting the operating section 2 and base section 3 so that the junction section 4 allows the operating section 2 to be displaced relative to the base section 3. The operating section 2 is movable or displaceable in three directions depicted by double-headed arrows A, B and C in response to operation by a human operator. The operating section 2 includes a rod-shaped main shaft 5 (i.e., an operating arm) extending along an X axis, a grip portion 6 provided at one end of the main shaft 5 for gripping by the human operator, and a stopper 7 provided at the other end of the main shaft 5. The base section 3, which extends along a Y axis, generally comprises two pipe-shaped shafts, i.e. reference shaft 8 (i.e., an arm portion) and free shaft 10 (i.e., a free arm). Overall length of the base section 3 is adjustable. The reference shaft 8 has a reference ball 9 (generally ball-shaped portion) provided at its one (i.e., distal) end, and the free shaft 10 has a free ball 11 (generally ball-shaped portion) provided at its one (i.e., distal) end. The junction section 4 includes a center controller 12 of a generally spherical shape, through which the main shaft 5 of the operating section 2 extends for movement or displacement in the arrow A direction. The junction section 4 also includes a frame or gimbal ring 13 rotatably supporting the center controller 12. On the outer periphery of the gimbal ring 13, there are provided a support portion 14 supporting the above-mentioned reference shaft 8, and a mounting portion 15 having the free shaft 10 secured thereto. Thus, there is provided a multi-axis movement mechanism (i.e., the junction section 4) that allows the operating section 2 to be displaced relative to the base section 3 with respect to a plurality of axes.

As will be later described more fully, the junction section 4 has pivot sections provided in corresponding relation to predetermined pivot axes X, Y and Z and pivotable about the axes X, Y and Z (i.e., X, Y and Z pivot axes), respectively, in response to displacement, in the directions of arrows A, B and C, of the operating section 2 caused by operation by the human operator. The displacement, in the directions of arrows A, B and C, of the operating section 2 can be detected as pivotal movement about the corresponding pivot axes X, Y and Z. Further, by the pivot sections imparting the operating section 2 with pivoting forces about the corresponding X, Y and Z pivot axes, it is possible to impart the operating section 2 with reactive forces, responsive to input operation by the human operator, in the three directions, i.e. arrow-A, arrow-B and arrow-C directions, corresponding to the X, Y and Z pivot axes.

The center controller 12, through which the main shaft 5 of the operating section 2 extends, is pivotable about the pivot axis Y in response to displacement, in the direction of arrow B, of the operating section 2 effected by the human operator (i.e., pivotal operation by the human operator in a vertical or up-and-down direction). The center controller 12 is pivotable about the pivot axis Z in response to displacement, in the direction of arrow C, of the operating section 2 effected by the human operator (i.e., pivotal operation by the human operator in a horizontal or left-and-right direction). Further, a linear position of the main shaft 5 relative to the center controller 12 changes as the operating section 2 is operated in the arrow A direction. The displacement, in the arrow A direction, of the operating section 2, which is forward or rearward linear movement as viewed from the human operator, is transformed, via a predetermined displacement transformation mechanism, into pivotal movement about the pivot axis X.

In the instant embodiment, the human operator can operate the operating section 2 in the directions of arrows A, B and C while holding the grip portion 6, to enter or control tone factors corresponding to operating positions, in the individual operational directions (i.e., with respect to the three displacement axes), of the operating section 2. As an example, volume control and/or minute volume control (e.g., velocity control) of tones to be generated may be performed in accordance with an operating position, in the arrow A direction (along the linear displacement axis), of the operating section 2, color control and/or decorative color control (e.g., vibrato control) of tones may be performed in accordance with an operating position, in the arrow B direction (about the vertical pivot axis), of the operating section 2, and pitch control of tones may be performed in accordance with an operating position, in the arrow C direction (about the horizontal pivot axis), of the operating section 2. Parameters for such control corresponding to the operational directions of the operating section 2 may be set and varied as necessary.

Figure 2:
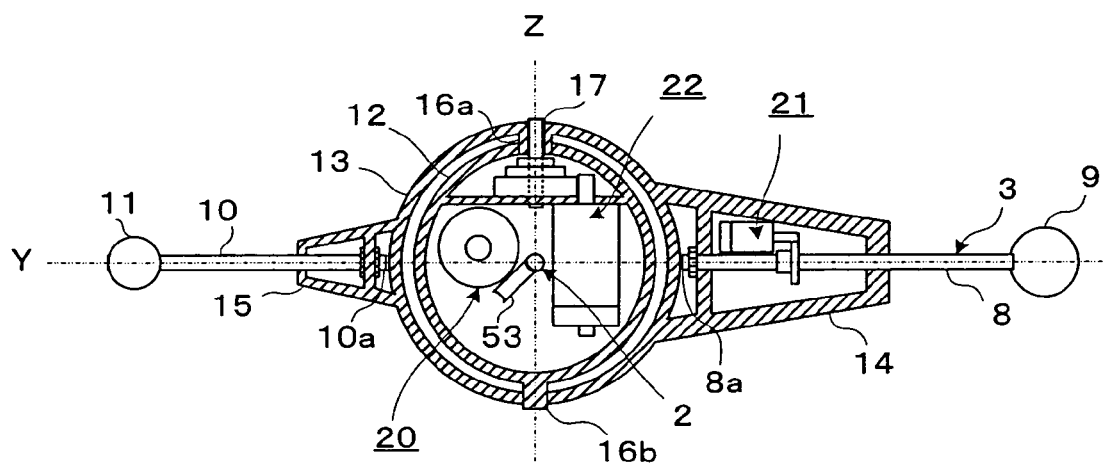
FIG. 2 is a schematic sectional view of the performance input apparatus as viewed in a direction of arrow D.

FIG. 2 is a schematic sectional view of the junction section 4 as viewed from a position of the grip portion 6 of the performance input apparatus 1, i.e., in a direction of arrow D of FIG. 1. As shown in the figure, the reference shaft 8 is secured at its proximal end 8a to the support portion 14 by means of a fastener member, such as a nut. The free shaft 10 is secured at its proximal end 10a to the free shaft mounting portion 15 for rotation about its axis relative to the mounting portion 15 and hence to the junction section 4. The center controller 12 is rotatably supported by the gimbal ring 13 via concave/convex connecting portions 16a and 16b; that is, the center controller 12 is rotatable relative to the gimbal ring 13 about the Z pivot axis with the concave/convex connecting portions 16a and 16b functioning as pivots. The connecting portion 16a is formed on the gimbal ring 13 along the Z pivot axis and having a distal end fitted in the center controller 12. The connecting portion 16b, located diametrically opposite to the connecting portion 16a, is formed on the center controller 12 along the Z pivot axis and having a distal end fitted in the gimbal ring 13. Center shaft 17 is a shaft extending along the Z pivot axis, through the connecting portion 16a, into the center controller 12 and has a distal end 17a (FIG. 3C) fixed to the gimbal ring 13. The center shaft 17 is interlocked with a Z-axis pivot section 22 contained in the center controller 12 as will be later described. Namely, via the center shaft 17, pivotal movement, about the Z pivot axis, of the center controller 12 responsive to input operation of the operating section 2 is transmitted to the Z-axis pivot section 22, and pivotal movement, about the Z pivot axis, of the Z-axis pivot section 22 is transmitted to the operating section 2 for reactive force impartment as will be later detailed.

Now briefly explaining a manner in which the performance input apparatus 1 is operated by the human operator, the input apparatus 1 is normally used in a positionally fixed condition with the reference ball 9 of the reference shaft 8 held by the human operator, or by being placed on the ground surface, or otherwise. With the reference ball 9 of the performance input apparatus 1 fixed at a predetermined position, the operating section 2 and center controller 12 are displaced relative to the base section 3 and junction section 4 (gimbal ring 13) in response to operation, by the human operator, of the operating section 2. For example, the human operator can fix the performance input apparatus 1 at a predetermined position by gripping the reference ball 9 with one hand and holding the free ball 11 between the chin and a portion of the shoulder near the neck, under which conditions the human operator can manipulate the operating section 2 by holding the grip portion 6 with the other hand. Alternatively, the performance input apparatus 1 may be positionally fixed with the reference ball 9 placed on the ground surface like a contra bass and the free ball 11 or free shaft 10 gripped with one hand, in which case too the human operator can manipulate the operating section 2 by holding the grip portion 6 with the other hand. The performance input apparatus 1 may be held in a positionally fixed state in any other suitable manner. Because the base section 3 is adjustable in its overall length as noted above, it can be adjusted to any desired length in accordance with the manner in which the input apparatus 1 is held, or in accordance with user's convenience.

Figure 3A:
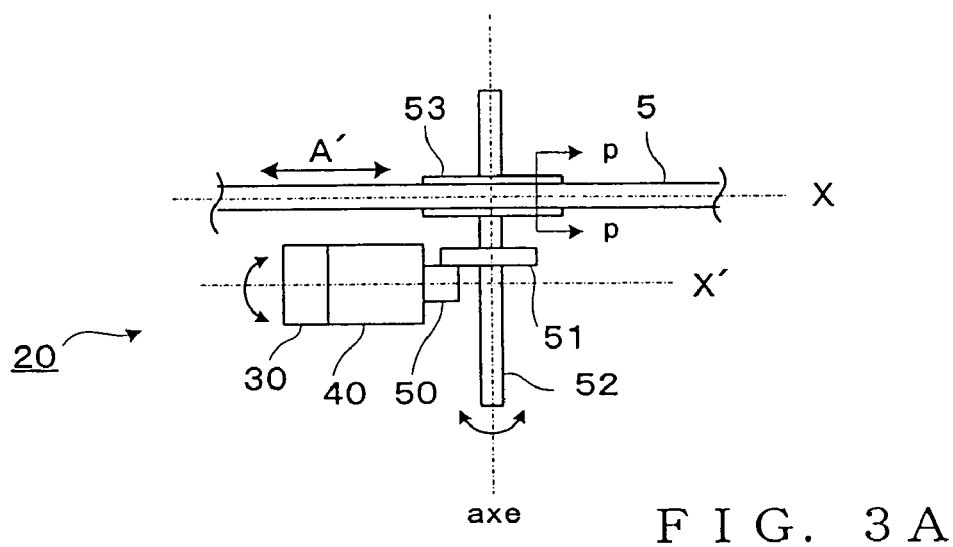
FIGS. 3A–3C are schematic sectional views showing example structures of an X-axis pivot section, Y-axis pivot section and Z-axis pivot section, respectively.
Figure 3B:
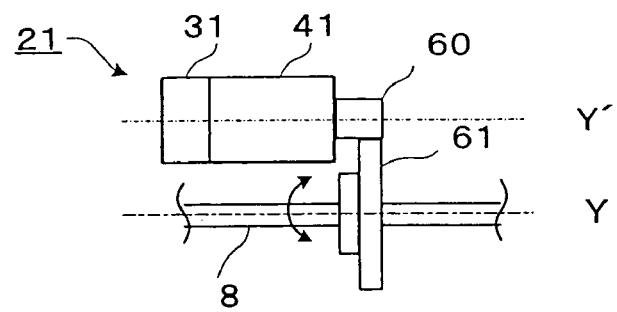
Figure 3C:
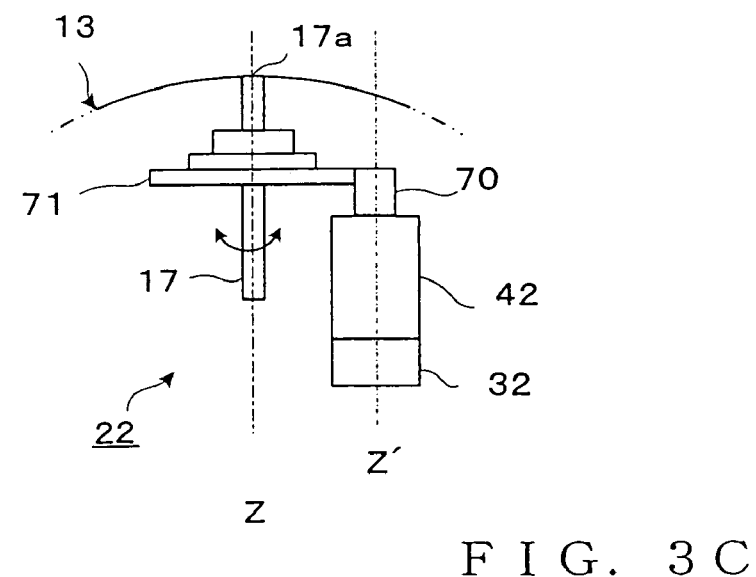

As also seen in FIG. 2, the X-axis pivot section 20 and Z-axis pivot section 22 are accommodated in the center controller 12, and the Y-axis pivot section 21 is accommodated in the support portion 14. FIGS. 3A–3C are schematic sectional views extractively showing the X-axis pivot section 20, Y-axis pivot section 21 and Z-axis pivot section 22.

The X-axis pivot section 20 includes an X-axis sensor section 30 for detecting an operating position of the operating section 2 along the X pivot axis, and an X-axis motor 40 performing pivotal movement about the X pivot axis, as illustrated in FIG. 3A. The Y-axis pivot section 21 includes a Y-axis sensor section 31 for detecting an operating position of the operating section 2 relative to (about) the Y pivot axis, and a Y-axis motor 41 for performing pivotal movement about the Y pivot axis, as illustrated in FIG. 3B. The Z-axis pivot section 22 includes a Z-axis sensor section 32 for detecting an operating position of the operating section 2 relative to (about) the Z pivot axis, and a Z-axis motor 42 for performing pivotal movement about the Z pivot axis, as illustrated in FIG. 3C.

The sensor sections 30–32 provided in corresponding relation to the pivot axes X, Y and Z may comprise rotational position sensors capable of detecting respective rotational positions, about the corresponding pivot axes, of the operating section 2. Detection data of the rotational position sensor sections 30–32 are output as position information, for the pivot axes X, Y and Z, of the operating section 2 (i.e., "position information X", "position information Y" and "position information Z"). Differentiating the detection data of the rotational position sensor sections 30–32 can determine operating velocity (speed) and acceleration of the operating section 2. Namely, even where the sensor sections 30–32 are in the form of rotational position sensors, the performance input section 1 can be arranged to detect displacement of the operating section 2 for desired displacement-related parameters, such as a position, velocity, acceleration, angle, etc. In one implementation, each of the sensor sections 30–32 may be arranged to detect a displacement-related parameter different from those allocated to the other sensor sections; namely, a displacement-related parameter to be detected by each of the sensor sections 30–32 may be defined independently of the other sensor sections. For example, the Xaxis sensor section 30 position information, the Y-axis sensor section 31 velocity information, and the Z-axis sensor section 32 acceleration information. Note that the sensor sections 30–32 may be in the forms of velocity or acceleration sensors, rather than position sensors, for detecting operating velocity or acceleration. Further, an operating position of the operating section 2 may be determined by integrating the velocity detected by the velocity sensor.

As the motor sections 40, 41 and 42, provided in corresponding relation to the X, Y and Z pivot axes, are driven, the corresponding pivot sections 20–22 are caused to pivot, so that separate or different reactive forces, responsive to the input operation by the human operator, are imparted to the operating section 2 in the respective directions of arrow A, arrow B and arrow C (see FIG. 1), independently among the X, Y and Z axes (i.e., on an axis-by-axis basis). Each of the motor sections 40, 41 and 42 is controlled, independently of the other motor sections, in accordance with reactive force information calculated therefor on the basis of the detection data output from the corresponding sensor section 30–32. Characteristics of the reactive force to be thus imparted independently for each of the X, Y and Z pivot axes may be set appropriately by finely adjusting the reactive force characteristics, such as a position, velocity, acceleration or the like.

Detailed structures of the X-axis pivot section 20, Y-axis pivot section 21 and Z-axis pivot section 22 will now be explained with reference to FIGS. 3A–3C. As illustrated in FIG. 3A, the X-axis pivot section 20, which includes the sensor section 30 and motor section 40, is oriented in such a manner that a pivot axis (rotation axis) X' of the motor section 40 extends parallel to the axis (pivot axis X) of the main shaft 5 of the operating section 2. On the X-axis motor section 40, there is provided a first gear 50 that is caused to pivot with pivotal or angular movement (i.e., rotation) of the motor section 40. Second gear 51 meshing with the first gear 50 is provided on a pivotal-movement transmission shaft 52 extending substantially perpendicularly to the pivot axis X', so that the second gear 51 is pivotable about an axis, denoted by "axe", together with the pivotal-movement transmission shaft 52. On the pivotal-movement transmission shaft 52, there is provided a pulley 53 engaging with the main shaft 5 of the operating section 2 and pivotable together with the transmission shaft 52. The second gear 51, pivotal-movement transmission shaft 52 and pulley 53 together constitute the above-mentioned displacement transformation mechanism. For example, the transmission shaft 52 or the rotation shaft of the motor section 40 coupled with first gear 50 interlocked with the transmission shaft 52 constitutes a rotary shaft of the X-axis pivot section 20.

As the motor section 40 is driven to cause the first gear 50 to pivot, the pivoting force of the first gear 50 is transmitted to the second gear 51. The transmitted pivoting force causes the second gear 51 to pivot about the axis axe. Namely, the pivotal movement about the pivot axis X' is transformed via the second gear 51 into pivotal movement about the axis axe. As the pivotal-movement transmission shaft 52 is turned about the axis axe in response to the pivotal movement of the second gear 51, the pulley 53 is caused to pivot about the axis axe.

FIG. 4 is a sectional view of an outer peripheral portion of the pulley 53 taken along the p—p line of FIG. 3A. As shown, the pulley 53 has a circumferential groove portion 53*a* formed along its outer peripheral surface. The groove portion 53*a* has a surface covered with a rubber member 53*b*, and the main shaft 5 of the operating section 2 engages with the groove portion 53*a* (see FIG. 2 and FIG. 3A). Rotating force of the pulley 53 acts on the operating section 2 (i.e., its main shaft 5), so that the operating section 2 is moved or displaced linearly in a direction of double-headed arrow A', as illustrated in FIG. 3A, in response to the rotation of the pulley 53. Frictional force between the rubber member 53*b* on the surface of the groove portion 53*a* and the main shaft 5 serves to prevent accidental slippage of the pulley 53 relative to the operating section 2, thereby ensuring that the rotating force of the pulley 53 acts on the operating section 2 with increased reliability. In this way, a reactive force can be imparted, via the X-axis pivot section 20, to the operating section 2 in the arrow A direction, through rotational driving of the motor section 40 about the pivot axis X'.

Further, because the main shaft 5 moves in the arrow A' direction of FIG. 3A as the operating section 2 is operated by the human operator in the arrow A direction (see FIG. 1), the pulley 53 turns about the axis axe due to the linear displacement of the main shaft 5, which causes the pivotal-movement transmission shaft 52 to turn about the axis axe. Such turning of the pivotal-movement transmission shaft 52 causes the second gear 51 to rotate, so that the first gear 50 meshing with the second gear 51 is caused to rotate about the pivot axis X'. The X-axis sensor section 30 operatively connected with the first gear 50 detects a rotational (angular) position of the first gear 50 to thereby provide position information indicative of an operating position, in the arrow A direction, of the operating section 2 corresponding to the detected rotational position.

As illustrated in FIG. 3B, the Y-axis pivot section 21, which includes the sensor section 31 and motor section 41, is oriented in such a manner that a pivot axis Y' of the motor section 41 extends parallel to the axis (pivot axis Y) of the reference shaft 8. On the Y-axis motor section 41, there is provided a gear 60 that turns in interlocked relation to rotation of the motor section 41. Spur gear 61 meshing with the gear 60 is fixedly provided on the reference shaft 8 for pivotal movement together with the reference shaft 8 about the pivot axis Y. For example, the reference shaft 8 or the rotation shaft of the motor section 41 coupled with gear 60 interlocked with the reference shaft 8 constitutes a rotary shaft of the Y-axis pivot section 21.

The motor section 41 is driven to cause the gear 60 to pivot, which in turn causes the spur gear 61 to pivot, and such pivotal movement of the spur gear 61 turns the reference shaft 8. Because the reference shaft 8 is secured at its one end 8*a* to the gimbal ring 13 as illustrated in FIG. 2, the pivoting force acting on the reference shaft 8 is transmitted to the gimbal ring 13. As noted above, the gimbal ring 13 supports the center controller 12 via the connecting portions 16*a* and 16*b* and pivotal movement, about the Y pivot axis, of the gimbal ring 13 is transmitted to the center controller 12, so that the center controller 12 pivots about the Y axis together with the gimbal ring 13, i.e. in response to driving of the Y-axis motor section 41. Therefore, the operating section 2 is imparted with a pivoting force about the Y axis in response to the pivoting force applied to the center controller 12. In this way, a reactive force can be imparted, via the Y-axis pivot section 21, to the operating section 2 in the arrow B direction, by driving the motor section 41 about the pivot axis Y' to thereby apply to the center controller 12 a pivoting force about the Y axis.

Further, as the operating section 2 is operated by the human operator in the arrow B direction (see FIG. 1), the center controller 12 is caused to pivot about the Y axis, which in turn causes the gimbal ring 13 to pivot about the Y axis so that the reference shaft 8 secured to the gimbal ring 13 turns about the Y axis. Then, as the turning of the reference shaft 8 rotates the spur gear 61, the gear 60 meshing with the spur gear 61 rotates. The Y-axis sensor section 31 operatively connected with the gear 60 detects a rotational (angular) position of the gear 60 to thereby provide position information indicative of a position, in the arrow B direction, of the operating section 2 corresponding to the detected rotating position.

Further, as illustrated in FIG. 3C, the Z-axis pivot section 22, which includes the sensor section 32 and motor section 42, is oriented in such a manner that a pivot axis Z' of the motor section 42 extends parallel to the pivot axis Z (FIG. 2). On the Z-axis motor section 42, there is provided a gear 70 that is turned with pivotal movement of the motor section 42. Spur gear 71 meshing with the gear 70 is fixedly provided on the center shaft 17 for pivotal movement together with the center shaft 17 about the pivot axis Z. Because the center shaft 17 is secured at its one end 17*a* to the gimbal ring 13 as illustrated in FIG. 2, the pivotal movement of the spur gear 71 effected via the motor section 42 is transmitted via the center shaft 17 to the gimbal ring 13 so as to act on the operating section 2. On the other hand, human operator's operation to pivot the operating section 2 about the Z pivot axis is transmitted via the gimbal ring 13 to the center shaft 17 so that it acts on the Z-axis pivot section 22. For example, the center shaft 17 or the rotation shaft of the motor section 42 coupled with gear 70 interlocked with the center shaft 17 constitutes a rotary shaft of the Z-axis pivot section 22.

The motor section 42 is driven to cause the gear 70 to pivot, which in turn causes the spur gear 71 to pivot, and such pivotal movement of the spur gear 71 turns the center shaft 17 having the spur gear 71 provided thereon. Because the center shaft 17 is secured at its one end 17*a* to the gimbal ring 13 as illustrated in FIG. 2, the pivoting force acting on the center shaft 17 is transmitted to the gimbal ring 13. As noted above, the center controller 12 is rotatably supported by the gimbal ring 13 via the concave/convex connecting portions 16a and 16b. Because the reference shaft 8 is fixed at a predetermined position in operation, the pivoting force, about the Z pivot axis, acting on the gimbal ring 13 does not pivot the gimbal ring 13, but it applies a force to the center controller 12 and gimbal ring 13 such that relative positional relationship between the controller 12 and gimbal ring 13 is varied about the Z pivot axis. As a consequence, the operating section 2 is imparted with a pivoting force about the Z pivot axis that corresponds to the above-mentioned force applied to the center controller 12 and gimbal ring 13. In this way, a reactive force can be imparted, via the Z-axis pivot section 22, to the operating section 2 in the arrow C direction, by driving the motor section 42 about the Z pivot axis to thereby apply to the center controller 12 a pivoting force about the Z axis.

Further, as the operating section 2 is operated by the human operator in the arrow C direction (see FIG. 1), the center controller 12 is imparted with a force to pivot the controller 12 about the Z pivot axis. Because the reference shaft 8 is fixed at a predetermined position, the center controller 12 is caused to pivot about the Z pivot axis relative to the gimbal ring 13 without the gimbal ring 13 itself pivoting at all. With the center shaft 17 secured to the gimbal ring 13, the center controller 12 pivots about the center shaft 17, i.e. the center shaft 17 is caused to turn relative to the center controller 12 in response to human operator's operation of the operating section 2. As the spur gear 71 pivots due to the turning of the center shaft 17, the Z-axis sensor section 32, operatively connected with the gear 70, detects an operating position of the gear 70 to thereby provide position information indicative of a position, in the arrow C direction, of the operating section 2 corresponding to the detected rotating position.

The pivot sections 20–22, provided in corresponding relation to the X, Y and Z pivot axes may be of other structures than the above-described, as long as the sections 20–22 are arranged to generate separate reactive forces to the operating section 2 through pivotal movement about the X, Y and Z pivot axes in the pivot sections 20–22 and detect an operating state of the operating section 2 in the form of the pivotal movement about the X, Y and Z pivot axes.

Figure 5:
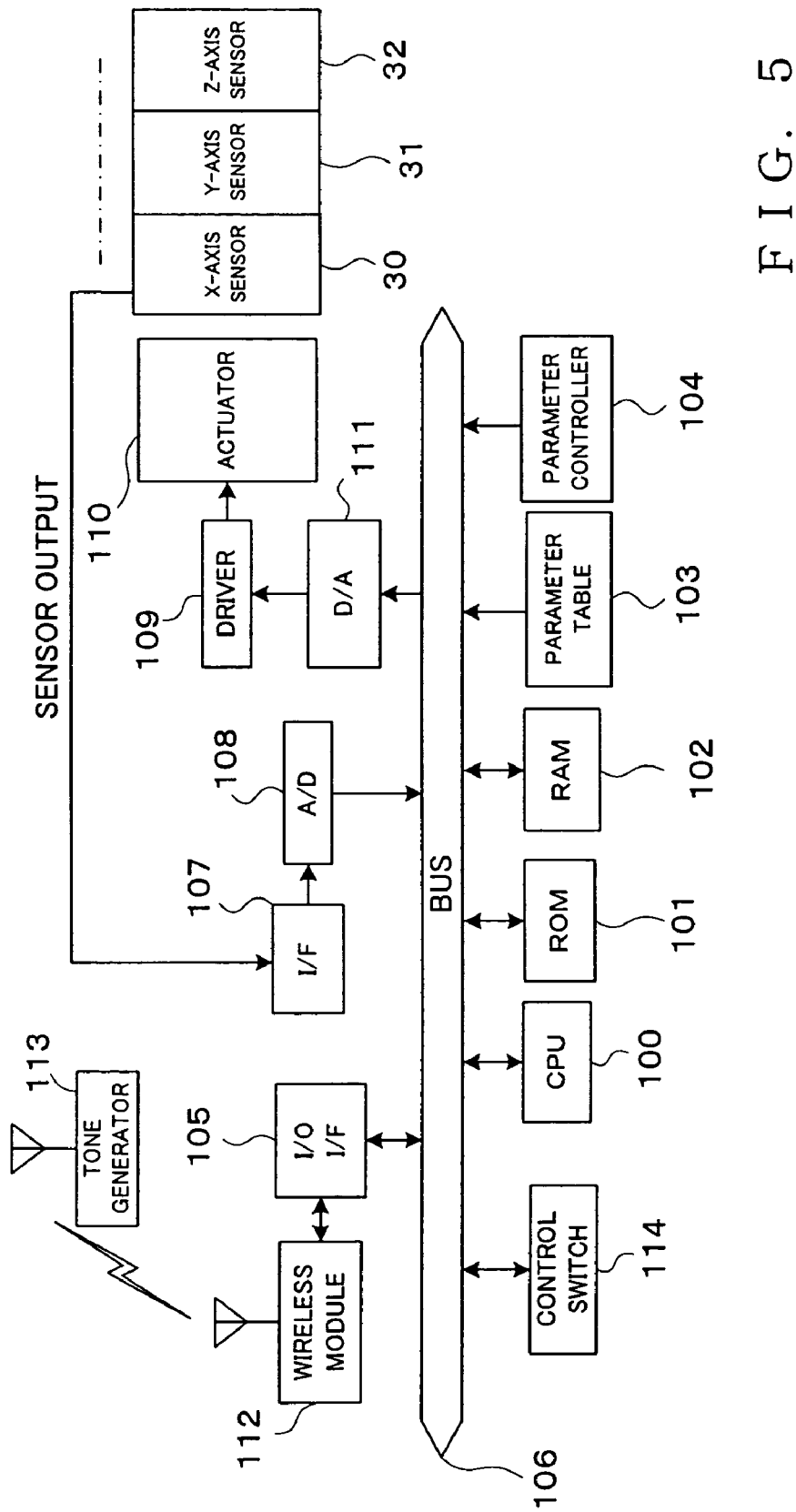
FIG. 5 is a block diagram showing an example hardware setup of the performance input apparatus.

FIG. 5 is a block diagram showing an example of an overall hardware setup of the performance input apparatus 1. As shown, the performance input apparatus 1 includes a CPU 100 for controlling behavior of the apparatus 1, a RAM 102 used as a working memory etc., a parameter table 103, a parameter controller 104, an input/output interface (I/F) 105, etc. and these components are interconnected via a communication bus 106. Interface 107 is provided for receiving outputs from the X-axis, Y-axis and Z-axis sensor sections 30, 31 and 32 in a time-division multiplexing manner. Each of the sensor outputs received via the interface 107 is converted by an A/D converter 108 into a digital signal, which is then supplied via the communication bus 106 to the CPU 100. To a driver 109 is connected an actuator 110 for driving the Xaxis, Y-axis and Z-axis motor sections 40, 41 and 42. Whereas the actuator 110 is shown in FIG. 5 as a single block, it may be constructed by combining three one-dimensional actuators for driving the respective motor sections 40–42.

The driver 109 controls driving of the actuator 110, i.e. turns on/off the actuator 110 in a controlled manner, on the basis of each drive signal generated under control of the CPU 100. The drive signal is supplied to the driver 109 after being converted into an analog signal via a D/A converter 111. Also, the drive signal may be in the form of a PWM (Pulse Width Modulated) current signal. The drive signal is reactive force information for imparting a reactive force to the operating section 2, and it is calculated separately for each of the X, Y and Z pivot axes on the basis of an output from the corresponding sensor section 30–32. The X-, Y- and Z-axis pivot sections 20–22 are driven (i.e., caused to make their respective pivotal movement) in accordance with the thus-calculated corresponding drive signals, so that reactive forces corresponding to operating states, on the three axes, of the operating section 2 are imparted to the operating section 2 on the axis-by-axis basis. Such arrangements allow the human operator to have a virtual sense of a performance, such as feels of reaction, contact, etc.

The parameter table 103 is a table to be used for calculating various parameters, such as performance parameters and reactive-force setting parameters. For example, the parameter table 103 can be used to set parameter values for various tone factors, such as a tone pitch, volume and color, corresponding to the sensor outputs received via the interface 107 (i.e., as a tone factor setting table) and set parameter values for setting reactive forces corresponding to the received sensor outputs (i.e., as a touch data table). Further, the reactive force setting parameter values set via the parameter table 103 may be modified depending on the tone generator used. Furthermore, the parameter table 103 may be used to change a scale of a train of tone pitches entered via the operating section 2. The parameter table 103 may be implemented by a ROM or a rewritable memory like a RAM. Alternatively, the parameter table 103 may be implemented via other means, such an external memory or communication network.

Control rules to be applied to the setting of the tone factor parameter setting values and reactive force setting parameter values may be variably set as desired via a parameter controller 104.

The touch data table stores a multiplicity of pieces of reactive force information for generating reactive forces to be imparted to the operating section 2 for, i.e. in correspondence with, the individual pivot axes in response to outputs (representing, for example, a position, velocity and acceleration) from the X-axis, Y-axis and Z-axis sensor sections 30, 31 and 32. Namely, from the touch data table, three pieces of reactive force information are output at a time which correspond to the outputs from the X-axis, Y-axis and Z-axis sensor sections 30, 31 and 32. The pieces of reactive force information are calculated in response to the outputs from the X-axis, Y-axis and Z-axis sensor sections 30, 31 and 32, in correspondence with the X, Y and Z axes. There may be used a different touch data table for each of the X, Y and Z axes.

In the tone factor setting table, there are stored data indicating correspondency between a plurality of possible operating positions within a movable range, in the arrow A direction (see FIG. 1), of the operating section 2 and a plurality of tone volume levels within a predetermined tone volume range; thus, a tone volume parameter corresponding to the output from the X-axis sensor section 30 is output from the table. In the tone factor setting table, there are stored data indicating correspondency between a plurality of possible operating positions within a movable range, in the arrow B direction (see FIG. 1), of the operating section 2 and a plurality of tone colors; thus, a tone color parameter corresponding to the output from the Y-axis sensor section 31 is output from the table. Further, in the tone factor setting table, there are stored data indicating correspondency between a plurality of possible operating positions within a movable range, in the arrow C direction (see FIG. 1), of the operating section 2 and a plurality of scale notes (tone pitches); thus, a note parameter corresponding to the output from the Z-axis sensor section 32 is output from the table.

In the illustrated example of FIG. 5, a wireless module 112 is connected to the input/output I/F 105 so that the performance input apparatus 1 is connected wirelessly, via the wireless module 112, with a tone generator 113 physically separated from the input apparatus 1. The wireless connection allows the input apparatus 1 to be readily connected with the tone generator 113 regardless of an installed place of the apparatus 1, and thus the user can carry the apparatus 1 to any desired place and enjoy a performance with the apparatus 1 at the desired place.

The CPU 100 refers to the tone factor setting table of the parameter table 103 to set parameter values of various tone parameters, such as a tone pitch, volume and color, corresponding to the sensor outputs received via the interface 107, and transmits the set parameter values to the tone generator 113. On the basis of the transmitted parameter values, the tone generator 113 generates a tone signal corresponding to operating positions relative to the individual axes. Namely, in the performance input apparatus 1, generation is instructed of a tone signal which correspond to operating positions, relative to the X, Y and Z axes, of the operating section 2; namely, generation of a single tone signal is instructed in accordance with an operating position relative to each of the X, Y and Z axes of the operation section 2. The tone generator 113 may employ any of the conventionally-known tone generation methods, such as the waveform memory method. Further, the tone generator 113 may be implemented either by a hardware tone generator board or by a software tone generator program.

As necessary, a control switch 114 may be provided, for example, on the grip portion 6 of the operating section 2, so that a necessary parameter value, such as that of a tone volume, can be set by rotation, depression or other form of operation of the control switch 114. Although such a control switch 114 is not necessarily essential to the features of the present invention, the provision of the control switch 114 is preferable in that it allows a tone volume parameter to be set/controlled through human operator's operation with a fingertip or the like. As an example, the control switch 114 may be used to control an overall volume of a performed tone so that the velocity of a tone to be generated can be controlled in accordance with an operating velocity, in the arrow A direction (FIG. 1), of the operating section 2.

Now, a description will be given about primary control processing performed by the CPU 100 in the performance input apparatus 1 arranged in the above-described manner. As outputs of the X-, Y- and Z-axis sensor section 30–32, corresponding to operating positions on the individual axes, are supplied to the CPU 100, the CPU 100 performs a process for detecting the operating positions of the operating section 2 on the individual axes, on the basis of the supplied sensor outputs, per predetermined clock timing. Then, with reference to the parameter table 103, the CPU 100 calculates values of performance parameters, such as a tone pitch, volume and color, each corresponding to any one or any combination of the operating position, velocity and acceleration of each, of the axes or combination of the outputs for a plurality of the axes. Then, the CPU 100 performs a tone signal generation process to cause the tone generator 113 to generate a tone signal on the basis of the calculated performance parameters.

When the operating section 2 has been operated in the performance input apparatus 1, the CPU 100 performs, in addition to the above-mentioned tone signal generation process, a reactive force impartment process for imparting separate reactive forces to the operating section 2 in correspondence with the X, Y and Z pivot axes by supplying the driver 109 with drive signals for driving the actuator 110 in a controlled manner.

Separate drive signals are generated in corresponding relation to the X, Y and Z pivot axes on the basis of pieces of reactive force information output for the corresponding pivot axes. The following paragraphs describe a case where three parameters, such as an operating position, velocity and acceleration, for each of the pivot axes of the operating section 2 are input to the touch data table and reactive force information is calculated for that pivot axis on the basis of the three parameters.

Once operating positions, relative to (along or about) the three pivot axes, of the operating section 2 are detected via the X-, Y- and Z-axis sensor section 30, 31 and 32, respectively, the sensor outputs for the individual pivot axes (i.e., information of X-, Y- and Z-axis operating positions) are input via the interface 107 in a time-division multiplexing manner, and then supplied to the CPU 100 after being converted into digital signals. The CPU 100 differentiates the supplied sensor outputs (X-, Y- and Z-axis operating positions) to thereby calculate X-, Y- and Z-axis velocity values and even X-, Y- and Z-axis acceleration values. These X-, Y- and Z-axis operating positions, velocity values and acceleration values are then supplied to the touch data table. In turn, reactive force information to be applied to the pivot axis X (X-axis pivot section 20) is produced from the touch data table on the basis of the supplied X-axis position, velocity and acceleration values. Similarly, reactive force information to be applied to the pivot axis Y (Y-axis pivot section 21) is produced from the touch data table on the basis of the supplied Y-axis position, velocity and acceleration values, and reactive force information to be imparted to the pivot axis Z (Z-axis pivot section 22) is produced from the touch data table on the basis of the supplied Z-axis position, velocity and acceleration values.

Then, on the basis of the supplied X-, Y- and Z-axis reactive force information, the CPU 100 generates drive signals for driving the actuator 110 which correspond to the X, Y and Z pivot axes. The thus-generated drive signals are supplied via the D/A converter 111 to the driver 109, which in turns drives the actuator 110 in a controlled manner, as noted above. Specifically, the drive signals, corresponding to the X, Y and Z pivot axes, are supplied to the driver 109 time-divisionally among the pivot axes to which the pieces of reactive forces are to be imparted, in accordance with which the actuator 110 drives the X-, Y- and Z-axis motor sections 40, 41 and 42 in a controlled manner on a time-divisional basis so that the X-, Y- and Z-axis pivot sections 20, 21 and 22 impart the operating section 2 with respective reactive forces about the pivot axes X, Y and Z. In this way, reactive forces can be produced and imparted to the operating section 2 in the directions of arrow A, arrow B and arrow C (see FIG. 1) in response to operating states, in the three directions, of the operating section 2. Because the reactive forces to be imparted in correspondence with the three pivot axes are variable in accordance with the operating states (three parameters of an operating position, velocity and acceleration), there can be produced reactive forces responsive to not only variation in the operating position of the operating section 2 but also variation over time (i.e., temporal variation) of the operating section 2. The parameters (i.e., parameters to be input to the touch data table) to be used for calculation of the reactive force need not necessarily be all of the above-mentioned three parameters; at least any one of the operating position, velocity and acceleration parameters may be used for calculation of the reactive force. Further, angle, pressure and/or other information may be used in addition to the above-mentioned parameters.

FIG. 6A is a perspective view showing a modified example of the performance input apparatus. In the figure, there are shown only an operating section 200 of the performance input apparatus, and pivot sections 201, 202 and 203 corresponding to the X-, Y- and Z pivot axes. The operating section 200 extends through a guide section 90, and the guide section 90 functions to not only transmit displacement, responsive to operating states on the individual axes, of the operating section 200 to the corresponding pivot sections 201–203 but also transmit pivotal forces, produced about the X-, Y- and Z pivot axes, to the operating section 200. Each of the pivot sections 201–203 includes a rotary motor and a rotational position sensor.

The guide section 90 is generally in the shape of a cylinder, and the rod-shaped operating section 200 inserted through the guide section 90 is linearly movable in the arrow A direction relative to the guide section 90 but moves together with the guide section 90 as for the other directions. The guide section 90 is constructed to operate in interlocked relation to the rotation shaft (not shown) of the motor (Y-axis motor) in the Y-axis pivot section 202, and pivotal movement in the arrow B direction of the operating section 200 is transmitted via the guide section 90 to the Y-axis pivot section 202. The Y-axis pivot section 202 is supported via bearings on a Y-axis base section 91 together with the guide section 90. The Y-axis base section 91 is fixed to the upper surface of a Z-axis base section 92. The Z-axis base section 92 is constructed to operate in interlocked relation to the rotation shaft (not shown) of the motor in the Z-axis pivot section 203, so that pivotal movement, in the arrow C direction, of the operating section 200 is transmitted to the Z-axis pivot section 203 via the guide section 90, Y-axis base section 91 and Z-axis base section 92. Casing of the X-axis pivot section 201 is connected to the guide section 90 via a casing of a gear box 93, so that the X-axis pivot section 201 moves with the guide section 91 in response to pivotal movement of the operating section 200 in the arrow A and arrow B directions. The gear box 93 function as a displacement transformation mechanism which not only transforms linear displacement, in the arrow A direction, of the operating section 200 into pivotal movement in the X-axis pivot section 201 but also transforms pivotal movement produced in the X-axis pivot section 201 into linear displacement, in the arrow A direction, of the operating section 2. As illustratively shown in FIG. 6B, the operating section 200 has an elongated gear tooth portion 200a provided in an axial direction thereof and having teeth at predetermined pitches. Further, within the gearbox 93, there is provided a slide gear mechanism 93a meshing with the gear tooth portion 200a and rotatable in operatively interlocked relation to the rotation shaft (not shown) of the motor in the X-axis pivot section 201.

As the operating section 200 is operated in the arrow A direction, the slide gear mechanism 93a, meshing with the gear tooth portion 200a, is pivoted in accordance with an amount of the linear displacement, in the arrow A direction, of the operating section 200. The X-axis pivot section 201 detects the pivotal movement of the gear mechanism 93a so that an operating position, in the arrow A direction, of the operating section 200 can be detected on the basis of the detected pivoted position of the gear mechanism 93a. On the other hand, as the X-axis motor contained in the X-axis pivot section 201 is driven, the slide gear mechanism 93a is pivoted, and this pivotal movement of the gear mechanism 93a is transformed via the gear tooth portion 200a into a linear drive force opposite in direction to the operation, in the arrow A direction, of the operating section 200. In this way, a reactive force can be imparted to the operating section 200 in the arrow A direction (i.e., reactive force in a forward or rearward direction as viewed by the human operator). As the operating section 200 is operated in the arrow C direction, pivotal movement, about the Z pivot axis, of the operating section 200 acts on all of the components on the Z-axis base section 92 via the guide section 90. The Z-axis pivot section 203 detects a pivoted position of the Z-axis base section 92, functioning as a supporting point of the pivotal movement, so that an operating position, in the arrow C direction, of the operating section 200 can be detected on the basis of the detected pivoted position of the base section 92. On the other hand, as the Z-axis pivot section 203 is driven to make pivotal movement, the pivotal movement about the Z pivot axis is transmitted to and acts on all of the components on the Z-axis base section 92 with the Z-axis base section 92 functioning as a supporting point of the pivotal movement. In this way, a reactive force opposite in direction to the operation, in the arrow C direction, of the operating section 200 can be imparted to the operating section 200 (i.e., pivotal movement in a leftward or rightward direction as viewed by the human operator). Furthermore, as the operating section 200 is operated in the arrow B direction, the guide section 90 is caused to pivot about the Y pivot axis with the bearing portion of the Y-axis base section 91 functioning as a supporting point of the pivotal movement. The Y-axis pivot section 202 detects a pivoted position of the guide section 90, so that an operating position, in the arrow B direction, of the operating section 200 can be detected on the basis of the detected pivoted position of the guide section 90. On the other hand, as the Y-axis pivot section 202 is driven to pivot, the pivotal movement about the Y pivot axis is transmitted to and acts on the guide section 90. In this way, a reactive force opposite in direction to the operation, in the arrow B direction, of the operating section 200 can be imparted to the operating section 200 (i.e., reactive force in an upward or downward direction as viewed by the human operator).

Whereas the preferred embodiments of the present invention have been described in relation to a performance input apparatus imitating a violin-like performance style using a bow-shaped operator, it should be appreciated that the present invention can also simulatively reproduce various other performance styles, such as one that produces various tone pitches using a sliding operator (sliding pipe) as in a trombone. Further, the various tone factors to be controlled in accordance with operating states of the operating section 2 are not limited to the aforementioned factors (tone pitch, color, volume, etc.). Further, the performance input apparatus of the present invention may also be applied to data input in various games, CAD designing, etc. without being limited to musical performance input. Namely, the performance input apparatus described above may be employed as performance or operation input apparatus for data input to various games or CAD designing, in which case control signals output from the input apparatus function as control signals corresponding to intended purposes other than tone control.

In summary, the present invention is characterized by detecting positional displacement of the operating section as pivotal movement about the predetermined pivot axis and imparting a reactive force in a direction along the pivot axis on the basis of the detected displacement. Thus, the inventive performance input apparatus permits performance information input operation imitating or simulating a performance style in violin-type instruments operable with a bow-shaped operator, with a small and simple structure. In addition, such inventive arrangements allow the human operator to have a virtual sense of performance, such as feels of reaction, contact, etc. Also, the inventive performance input apparatus, despite its small and simple structure, can properly detect relatively great displacement of the operating section and achieve appropriate reactive force impartment based on such displacement detection.

What is claimed is:

1. A performance input apparatus comprising:
   a base section;
   an operating section displaceable, in response to operation by a human operator, relative to said base section with respect to at least one displacement axis, said at least one displacement axis including a linear-displacement axis along which said operating section is linearly displaceable;
   a pivot section including a rotary shaft rotatable about a predetermined pivot axis and a mechanism that transforms rotary movement of said rotary shaft into linear movement along said linear-displacement axis;
   a detection section that detects displacement corresponding to linear movement of said operating section along said linear-displacement axis, responsive to the operation by the human operator, for at least one parameter selected from a group of parameters including a position, angle, velocity and acceleration, and outputs a detection signal corresponding to the detected parameter;
   a reactive force information generation section that generates reactive force information on the basis of the detection signal outputted by said detection section;
   a rotary driver that drives the rotary shaft of said pivot section on the basis of the reactive force information so that said mechanism of said pivot section transforms the rotational movement of said rotary shaft into linear movement along said linear-displacement axis of said operating section to thereby impart a linear reactive force to said operating section; and
   an output section that outputs a control signal responsive to the operation, by the human operator, of said operating section on the basis of the detection signal outputted by said detection section.

2. The performance input apparatus as claimed in claim 1, wherein said output section outputs a control signal for controlling a tone on the basis of the detection signal outputted by said detection section.

3. The performance input apparatus as claimed in claim 1, wherein said operating section is displaceable, in response to operation by the human operator, with respect to first and second pivotal-displacement axes,
   said pivot section further includes first and second rotary shafts corresponding to first and second pivot axes provided in corresponding relation to the first and second pivotal-displacement axes,
   said detection section further detects first and second pivotal displacement corresponding to pivotal movement of said operating section along said first and second pivotal-displacement axes, responsive to the operation by the human operator, and outputs first and second detection signals corresponding to the first and second pivotal displacement;
   said reactive force information generation section further generates first and second reactive force information in correspondence with the first and second pivot axes on the basis of the first and second detection signals, and
   said performance input apparatus further comprises first and second rotary drivers provided in corresponding relation to the first and second rotary shafts corresponding to the first and second pivot axes, and said first and second rotary drivers drive a corresponding one of the first and second rotary shafts, on the basis of the first and second reactive force information corresponding to the first and second pivot axes, to thereby impart a different reactive force to said operating section for each of the first and second pivotal-displacement axes.

4. The performance input apparatus as claimed in claim 3, wherein
   each of the first and second pivotal-displacement axes of said operating section is associated with any of a plurality of tone factors, and
   said output section generates, in response to the first and second detection signals outputted by said detection section for the first and second pivotal-displacement axes, a control signal for setting or controlling a respective tone factor.

5. The performance input apparatus as claimed in claim 4, wherein said detection section detects displacement of said operating section responsive to the operation for each of the first and second pivotal-displacement axes, by detecting displacement of each of the first and second rotary shafts corresponding to the first and second pivot axes.

6. The performance input apparatus as claimed in claim 4, wherein said detection section detects, for each of the first and second pivot axes, a displacement-related parameter of a type defined independently for the first and second pivot axes.

7. The performance input apparatus as claimed in claim 3, wherein said first and second rotary drivers are provided in corresponding relation to the first and second pivot axes, in such a manner that counter torque is applied, for each of the first and second pivotal-displacement axes, to the displacement of said operating section produced on the first and second pivotal-displacement axes, to thereby impart a reactive force to said operating section independently for each of the first and second pivotal-displacement axes.

8. The performance input apparatus as claimed in claim 1, which is portable, and wherein said operating section is operable by the human operator with said base section held by the human operator.

9. The performance input apparatus as claimed in claim 8, wherein said operating section is operable by the human operator with said base section placed in contact with a ground surface or a surface of a floor or table.

10. The performance input apparatus as claimed in claim 1, wherein said operating section includes an operating arm operable by the human operator, and a multi-axis movement mechanism that allows said operating section to be displaced relative to said base section with respect to a plurality of axes.

11. The performance input apparatus as claimed in claim 10, wherein said base section includes an arm portion extending from said multi-axis movement mechanism in one direction and a free arm extending from said multi-axis movement mechanism in a direction opposite to the one direction, and wherein, in displacing said operating section relative to the arm portion, the human operator can hold the free arm.

* * * * *